Feb. 21, 1939.   W. J. KROPP   2,147,793
PROCESS OF MANUFACTURING PACKING AND INSULATING MATERIAL
Filed June 4, 1937   2 Sheets-Sheet 1
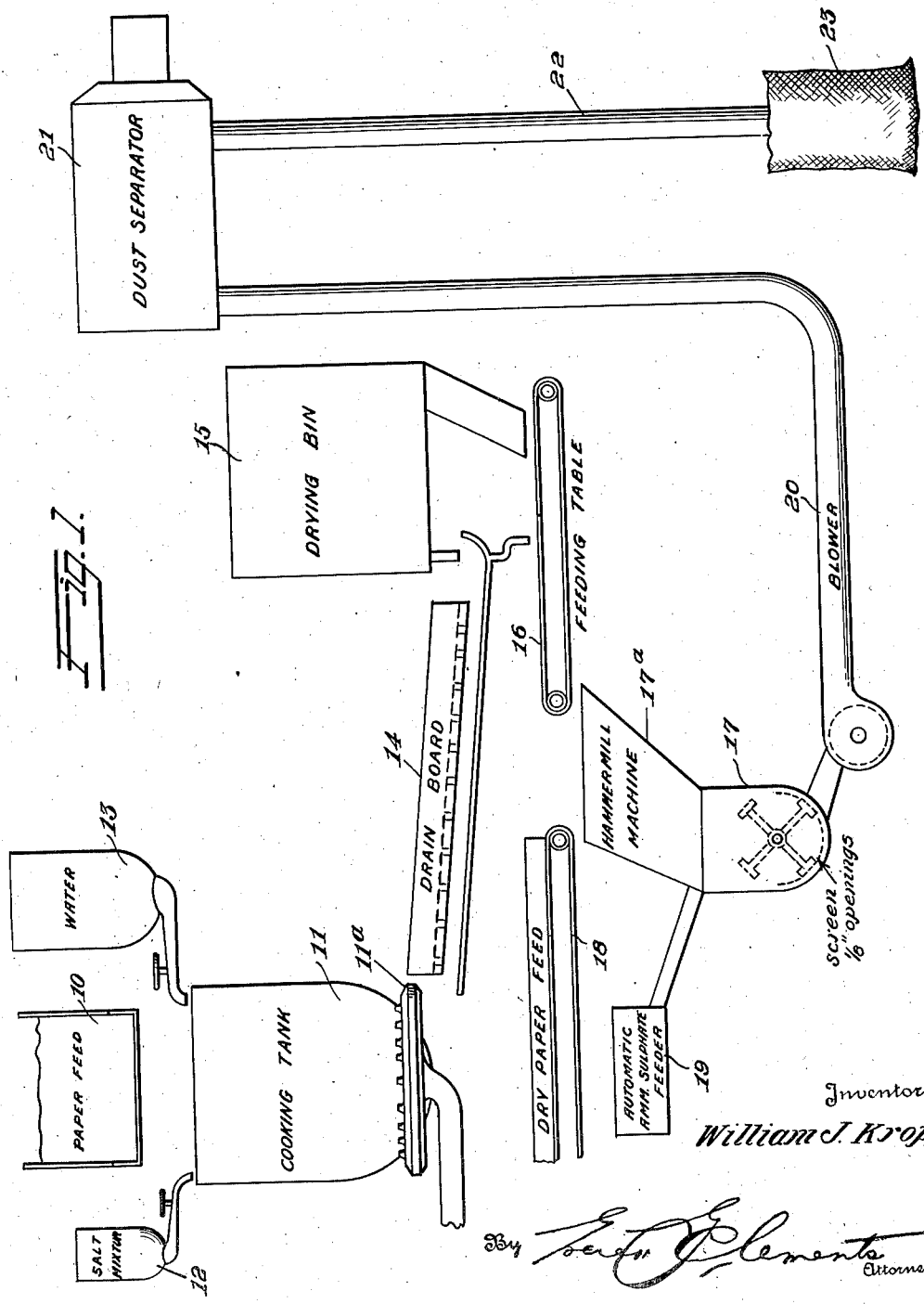

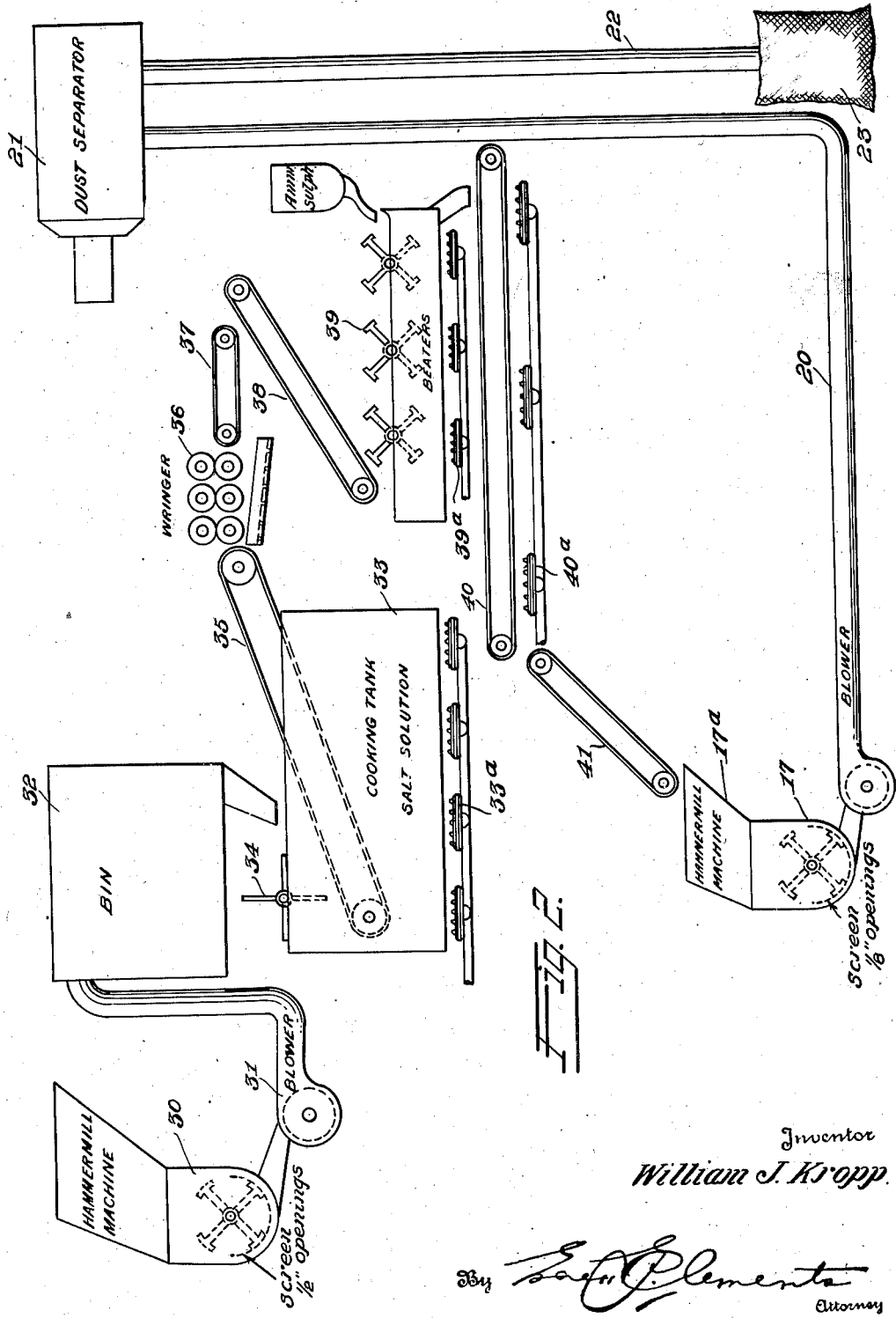

Patented Feb. 21, 1939

2,147,793

UNITED STATES PATENT OFFICE 2,147,793

PROCESS OF MANUFACTURING PACKING AND INSULATING MATERIAL

William J. Kropp, Wichita, Kans.

Application June 4, 1937, Serial No. 146,503

2 Claims. (Cl. 154—28)

This invention relates to the art of insulation and has particular reference to a process for making a packing and insulating material and more specifically is directed to a process of making an insulating fibrous material in a crumpled, loose and fluffy form, the particles of the material being of an appropriate size.

One of the objects of the invention is the making of an insulating fibrous composition from refuse or waste paper, such as newspaper print, cardboard and the like, to produce a packing material useful as insulation in maintaining certain temperatures. Such a material finds special application in storage packing and in storage plants and is especially valuable as a filler in the packing of articles in crates, boxes and the like.

Still a further aim is the preparation of a product such as specified which is fireproof; of a crumpled, loose and fluffy, flake-like texture and consistency, the product being reduced during the operation of the process to a size to pass through a one-eighth inch woven mesh screen.

This application is a continuation-in-part of my prior application, Serial No. 8,877, filed March 1, 1935.

Other aims and objects than those specified above will be apparent from the detailed description hereinafter appearing when taken in conjunction with the appended drawings forming a part hereof to which reference is now made and in which—

Figure 1 is a schematic elevational view of one form of apparatus adapted for making the product of the present invention; and Figure 2 is a view similar to Figure 1, but of a modified form of apparatus.

Referring now to Figure 1 of the drawings, there is shown at 10 a paper feed of any approved or conventional form and which is adapted to supply refuse paper, old magazines, cardboard or a mixture of the same to the cooking tank 11. As shown, the bottom of the tank 11 may be heated by a gas burner as 11ª, or by means of steam coils or in any other desired manner. The paper feed 10 is situated vertically above the cooking tank 11, as is also a salt mixture dispensing device 12, and water feed tank 13. The dispensing device 12 contains a dry intimate fireproofing mixture of 8 parts by weight of ammonium sulphate, 3 parts by weight of boric acid, and 2 parts by weight of borax. In the operation of the process, 150 parts of water by weight is added to the cooking tank for each 13 parts of the salt mixture. After the addition of the fireproofing salt mixture and water to the cooking tank in the proportions specified above, the solution of these salts is heated to 122° F., followed by the addition of the paper stock with the heating continued for a period of thirty minutes, whereby the stock is thoroughly impregnated with the salt solution.

The cooked stock is then removed from the tank 11 and deposited on a drain board 14, where the excess moisture is permitted to run off. The partially dried stock is then fed to a drying bin 15 and allowed to dry for a period of time sufficient to remove an additional quantity of the moisture still present in the stock. Situated vertically below the drying bin 15 is a feeding table 16 adapted to feed into a conventional hammermill machine 17, or other comminuting device capable of reducing the product of a size hereinafter referred to. Leading to the latter from the opposite direction is a dry paper stock feed 18 and an automatic ammonium sulphate dispenser 19.

The feeding table 16 carries the still somewhat damp cooked paper stock from the drying bin 15 and deposits it into the hopper 17ª of the hammermill 17. The dry paper feed 18 carries a quantity of dry untreated refuse paper, such as initially used at the beginning of the process and deposited from the paper feed 10, to the hopper 17ª. For every 25 parts by weight of damp cooked stock delivered to the hammermill, there is added to the latter 75 parts by weight of dry stock by means of the dry paper feed 18. For every hundred parts of combined damp and dry paper stock, there is deposited in the hammermill five to ten parts of dry ammonium sulphate from the feeder or dispenser 19. The mixture of damp paper stock, dry stock and dry ammonium sulphate is comminuted in the hammermill 17 so that the resultant product is a dry material of a size to pass through a one-eighth inch mesh screen forming a part of the mill; the heat generated by the action of the hammers of the hammermill on the product during the comminuting action thereof serving to remove the last traces of moisture from the product. The material thus treated is drawn from the hammermill by a blower 20 and delivered to the dust separator 21 from which it passes to a filling pipe 22 for packing into sacks 23. The dust separator removes all the dust generated by the hammermill so that the final product delivered to the sack 23 is in a fluffy, loose form of substantially uniform size and consistency.

Referring now to the apparatus shown in Figure 2 of the drawings, the newspaper, cardboard and the like is first comminuted in a hammermill 30 provided with a one-half inch wire screen. A blower 31 removes the product from the hammermill 30 to a bin 32 from which it is fed to cooking tank 33 provided with burners 33ᵃ. The cooking tank contains a salt solution of the character specified with reference to the description of the apparatus of Figure 1 and the proportions of materials and the temperature of the cooking is the same as already described. Cooking tank 33 is provided with beaters 34 which force the cooked material through the salt solution after which the treated paper is taken up on a conveyor 35 to a wringer 36 which squeezes out a considerable quantity of the moisture in the paper. From the wringer 36 the treated paper passes to conveyors 37, 38 to beaters 39 provided with burners 39ᵃ at which point the dry ammonium sulphate salt is added. The treatment at this point in the apparatus further dries the damp paper and additionally breaks it up into particles. From beaters 39 the broken material passes to a steel conveyor belt 40 provided with burners 40ᵃ where final drying takes place. A conveyor 41 carries the dried material to hopper 17ᵃ of hammermill 17, from which it is drawn by blower 20 and delivered to dust separator 21 and through filling pipe 22 into sacks 23 as in the apparatus described in Figure 1.

Various other changes and modifications may be made to embody the spirit and purpose of the invention and it is contemplated to cover such variations and to be limited in this respect only as may be necessary by the scope of the appended claims.

Having thus set forth the invention what I claim as new and desire to secure by Letters Patent is:

1. The process of making a fibrous packing and insulating material in loose and fluffy form, comprising taking sheets of fibrous material and comminuting same, then cooking said comminuted material in a water solution of fireproofing salt, then treating said cooked material to remove water therefrom while adding dry salt thereto, and comminuting the treated material to form a mass of loose, fibrous particles of a size such as will pass through a one-eighth inch woven mesh screen.

2. The process of making a fibrous packing and insulating material in loose and fluffy form, comprising taking sheets of paper, and cooking said paper in a water solution of fireproofing salt, removing water therefrom, and comminuting the relatively dry paper to form a mass of loose, fibrous particles of a size such as will pass through a one-eighth inch woven mesh screen.

WILLIAM J. KROPP.